(12) United States Patent
Goodwin et al.

(10) Patent No.: US 6,948,976 B2
(45) Date of Patent: Sep. 27, 2005

(54) CABLE AND APPARATUS INTERFACE ENVIRONMENTAL SEAL

(75) Inventors: Kevin Goodwin, Orland Park, IL (US); Al Cox, Orland Park, IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 10/708,403

(22) Filed: Mar. 1, 2004

(65) Prior Publication Data

US 2005/0191903 A1 Sep. 1, 2005

(51) Int. Cl.⁷ .............. H01R 12/00; H01R 9/03
(52) U.S. Cl. ............ 439/578; 439/271; 439/610; 174/92
(58) Field of Search ............... 439/271, 578–582, 439/610; 174/92–93; 385/135

(56) References Cited

U.S. PATENT DOCUMENTS

| | | | | |
|---|---|---|---|---|
| 3,982,319 A | * | 9/1976 | Bice | 29/868 |
| 4,892,491 A | * | 1/1990 | Budano et al. | 439/582 |
| 4,960,392 A | * | 10/1990 | Dickie | 439/620 |
| 5,525,073 A | | 6/1996 | Sampson | 439/521 |
| 5,561,269 A | | 10/1996 | Robertson et al. | 174/92 |
| 5,684,274 A | | 11/1997 | McLeod | 174/92 |
| 5,691,508 A | | 11/1997 | Radliff et al. | 174/92 |
| 5,796,041 A | | 8/1998 | Suzuki et al. | 174/92 |
| 5,828,005 A | | 10/1998 | Huynh-Ba et al. | 174/92 |
| 5,844,171 A | | 12/1998 | Fitzgerald | 174/92 |
| 5,895,291 A | * | 4/1999 | Furio et al. | 439/610 |
| 5,938,475 A | * | 8/1999 | Penner et al. | 439/610 |
| 6,037,544 A | | 3/2000 | Lee et al. | 174/92 |
| 6,087,593 A | | 7/2000 | Skipworth et al. | 174/135 |
| 6,265,665 B1 | | 7/2001 | Zahnen | 174/92 |
| 6,280,235 B1 | | 8/2001 | Radliff | 439/467 |
| 6,544,070 B1 | | 4/2003 | Radliff | 439/596 |
| 6,545,219 B1 | | 4/2003 | Bukovnik et al. | 174/74 A |
| 6,609,931 B2 | * | 8/2003 | Parrish et al. | 439/578 |
| 6,809,265 B1 | * | 10/2004 | Gladd et al. | 174/74 R |
| 2004/0208467 A1 | * | 10/2004 | Rodrigues et al. | 385/135 |

* cited by examiner

Primary Examiner—Michael C. Zarroli
(74) Attorney, Agent, or Firm—Babcock IP, LLC

(57) ABSTRACT

A seal assembly adapted to seal around an interconnection between a cable and an apparatus. The seal assembly formed from two shell halves which join together around the interconnection that are sealed by a gasket against a connector body attached to the apparatus at an apparatus end and another gasket against the cable at a cable end. The cable end gasket is adapted to be pressed between the cable and a conical cable end gasket surface by a nut which threads onto a thread formed on the two shell halves. The nut and cable end gasket are adapted to attach to the cable without passing over a connector attached to the cable end. The cable end gasket has a slit and the nut is formed from two parts which join together, around the cable.

18 Claims, 3 Drawing Sheets

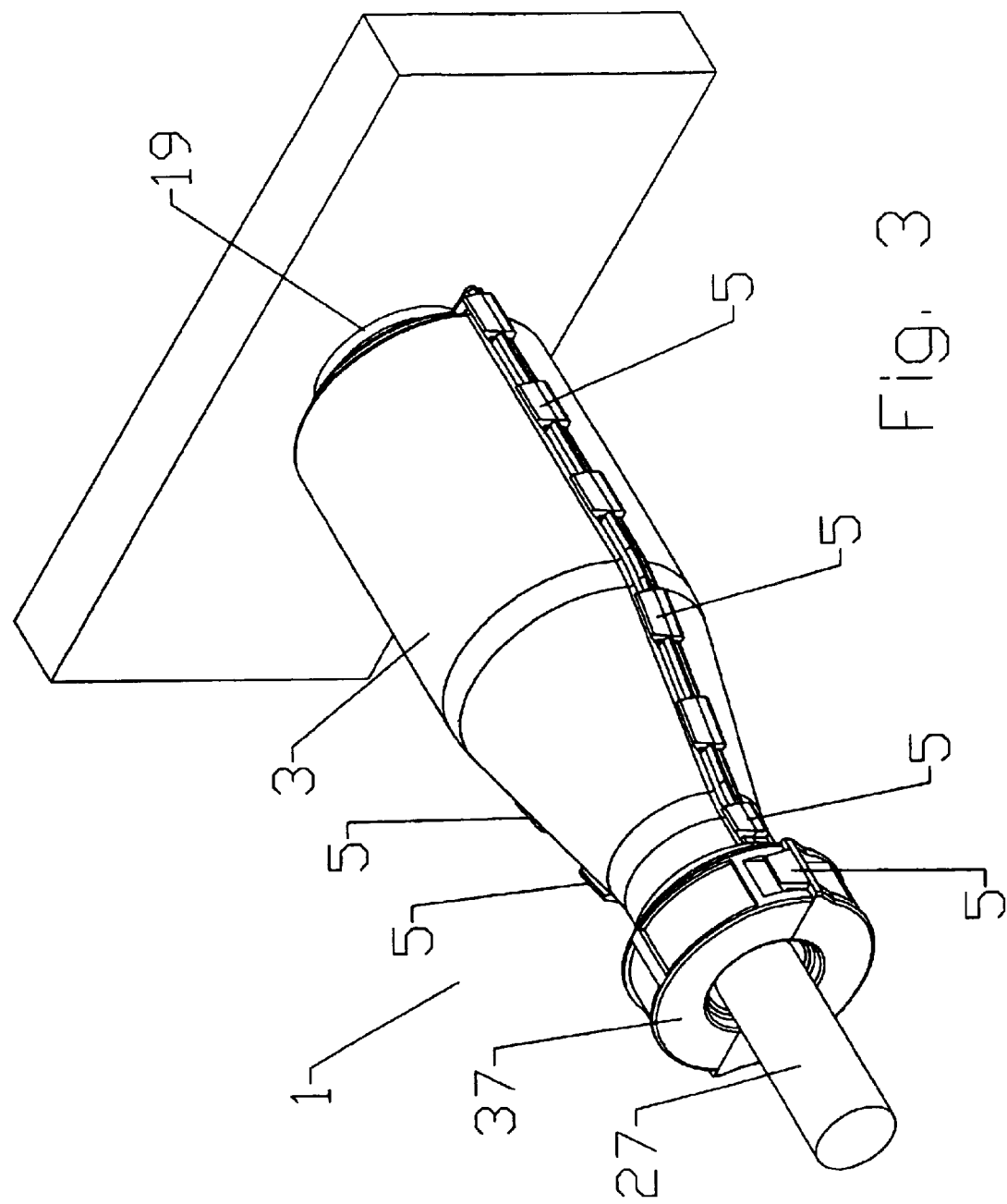

CABLE AND APPARATUS INTERFACE ENVIRONMENTAL SEAL

BACKGROUND OF INVENTION

1. Field of the Invention

The invention relates to sealing the interconnection between cables and apparatus, for example feed and or control cables interconnected with an antenna. More particularly, the invention provides a re-usable snap-on tool-less weather proof environmental seal assembly for a cable to apparatus interconnection.

2. Description of Related Art

Electrical interconnections are subject to degradation from environmental factors such as moisture, vibration and repeated expansion and contraction from daily temperature changes.

Environmental seals consisting of an outer enclosure that surrounds an electrical interconnection have been used, for example, to surround a cable end connector to cable end connector interconnection. The, for example, injection molded plastic enclosures have been configured to surround the cable interconnection with two halves in a clamshell hinged configuration that is sealed with a gel composition at cable exit points proximate either end. Alternatively, the enclosure may be entirely filled with a gel composition to provide a watertight and vibration dampening seal. The gel composition is useful because the exact radius of the cable which is sealed against may vary. However, gel sealing compositions are typically limited to environments where the temperature will be 60 degrees Celsius or less. Sealing assemblies used in equatorial installations may require temperature ratings of 80–85 degrees Celsius, outside of the temperature range of gel seals. Also, in the frequently vertical configuration of a cable to antenna attachment, a sealing system using gel at the limit of the specified temperature may become compromised due to gel migration and or leakage. Gel seals are typically not re-usable.

Feed and or control cable connections to antennas are also subject to environmental degradation. The interconnection with an antenna is typically to a connector body mounted to an exterior surface of the antenna. Therefore, there is a very small surface on the antenna side of the interconnection with which to form a seal. Because of this, prior practice has been to seal the antenna interconnection, or other apparatus with similar exterior surface mounted connectors, using a time consuming sealing wrap using rolls of butyl rubber, plastic and heat or cold shrink tape. The reliability of this form of manually applied seal is dependant upon the training and motivation of the installation personnel, which may be negatively influenced by the often hazardous and or environmentally exposed locations, for example high atop radio towers, where -they are installed. Further, once installed, a sealing wrap must be destroyed to again access the interconnection.

Competition within the electrical interface environmental seal industry has focused attention on reliability, reusability, ease of use, improved high temperature capabilities and overall reductions in manufacturing and installation costs.

Therefore, it is an object of the invention to provide an apparatus that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIG. 3 is an angled side isometric view of the interconnection sealing assembly of FIG. 1, fully assembled around a representative cable and apparatus interconnection.

DETAILED DESCRIPTION

Connections to an apparatus, for example an antenna, are typically made to a connector body mounted to an exterior surface of the antenna. Because the connector body is flush against a surface, a cable to cable interconnection sealing assembly that tapers at either end to a cable diameter is unusable.

Figure 1:
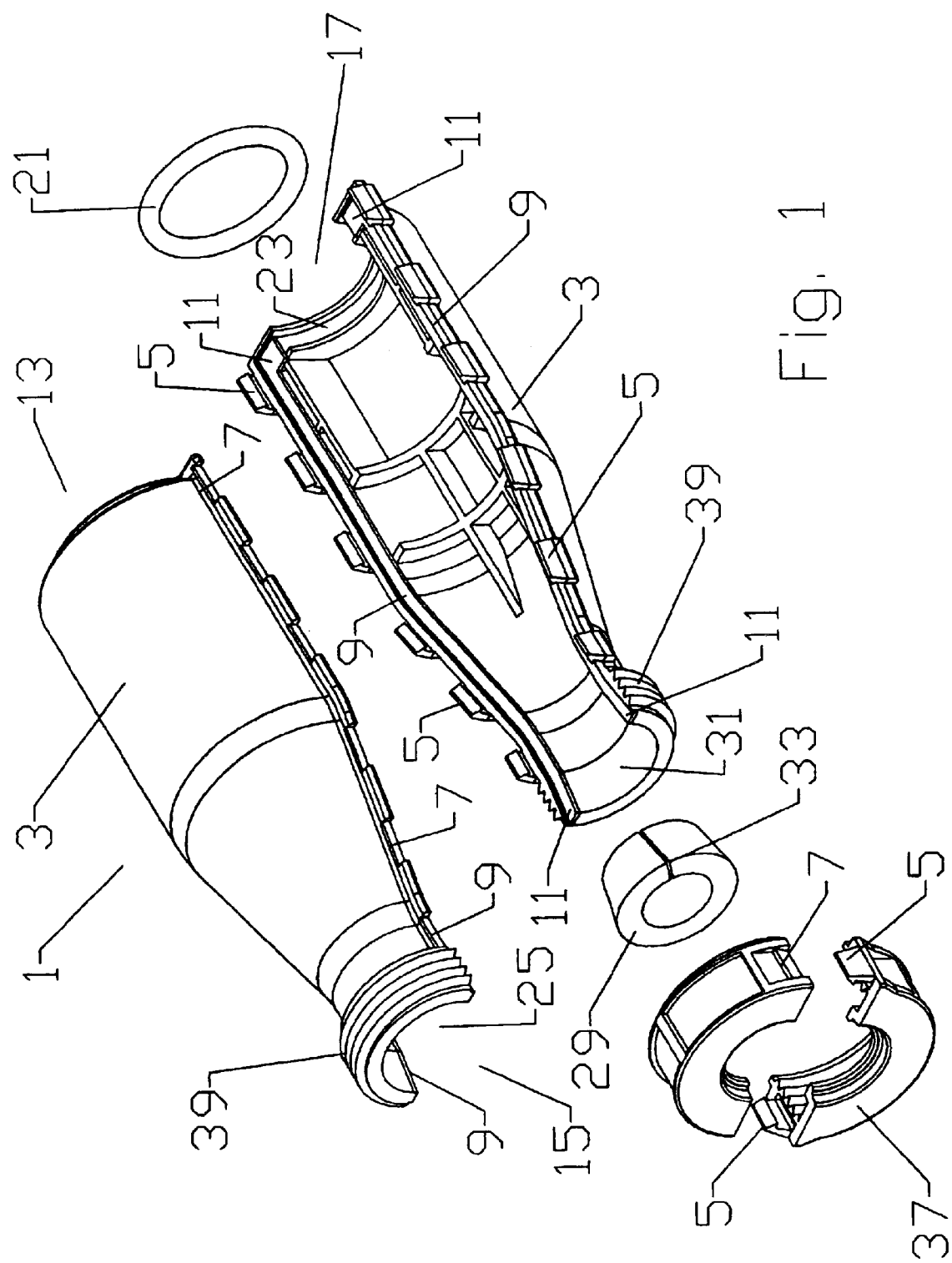
FIG. 1 is an exploded angled side isometric view of an interconnection sealing assembly according to one embodiment of the invention.
Figure 2:
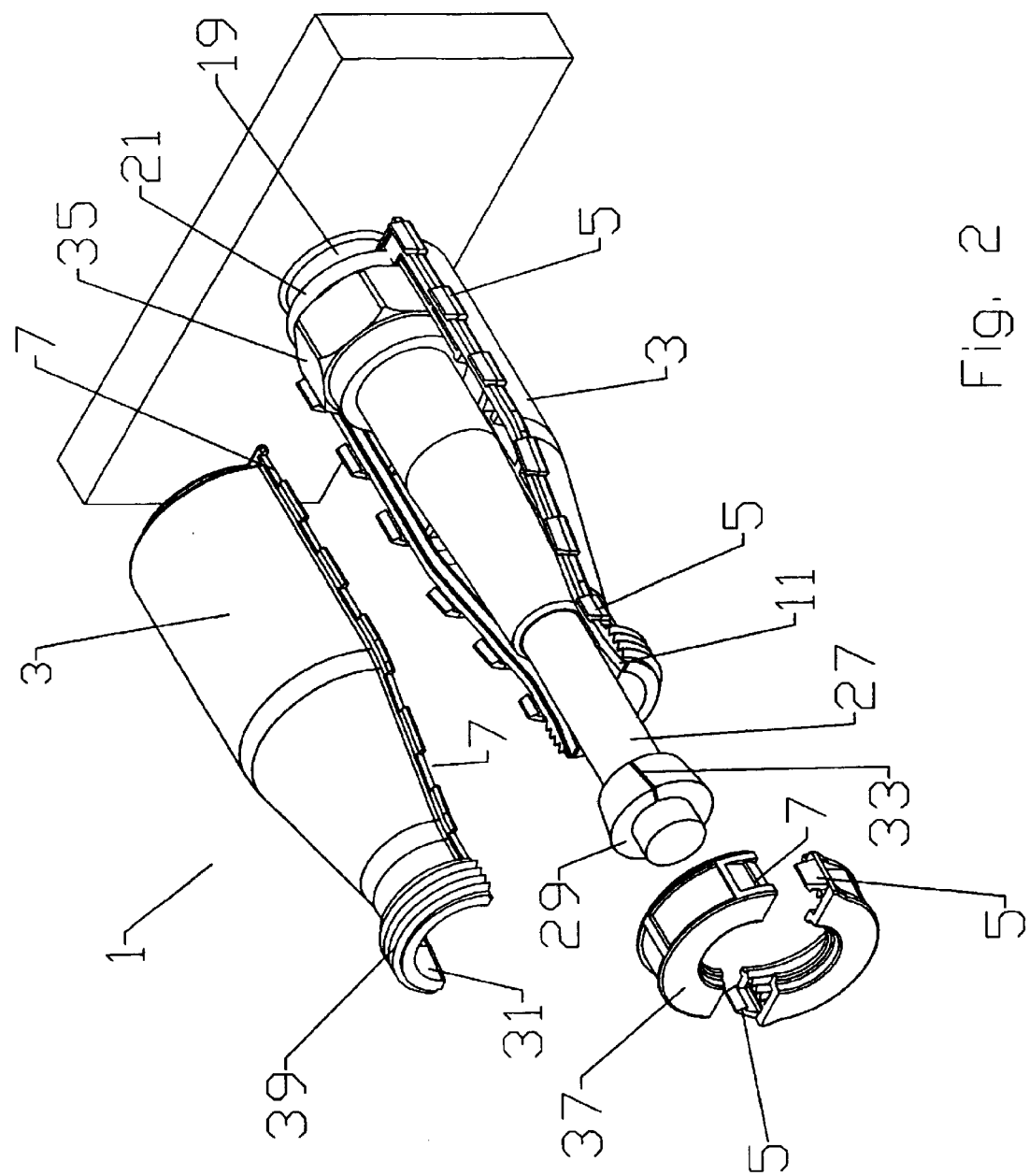
FIG. 2 is an exploded angled side isometric view of the interconnection sealing assembly of FIG. 1, partially assembled around a representative cable and apparatus interconnection.

As shown for example by FIGS. 1–3, a sealing assembly 1 according to one embodiment of the invention has two shell halve(s) 3 adapted to snap together around a desired interconnection space. The shell halve(s) 3 may be formed, for example, from an impact and UV degradation resistant plastic using injection molding.

A range of different connections between the shell halve(s) 3 may be used, for example, a plurality of hook tab(s) 5 which mate to a corresponding plurality of hook edge(s) 7. Alternative forms of connection may include other forms of snap together interconnection well known in the art and or a hinge that connects the two shell halves along one edge.

The edge(s) 9 between the two shell halve(s) 3 may be sealed by a, for example epdm, edge gasket 11. The edge gasket 11 may be pre-applied to one or both shell halve(s) 3. To retain the edge gasket 11 in place on the edge(s) 9 prior to snapping the shell halve(s) 3 together, the edge gasket 11 may pre-applied with an adhesive or be formed with tabs or other retainers that allow the edge gasket(s) 11 to be retained within, for example, an edge groove.

The sealing assembly 1 has openings at an apparatus end 13 and a cable end 15. An apparatus end opening 17 is adapted for a desired connector body 19 outer diameter. Connector dimensions are normally standardized. Therefore, the dimensions of the apparatus end opening 17 may be closely aligned to the expected connector body 19 outer diameter. The apparatus end 13 may be sealed by an apparatus end gasket 21, for example an o-ring, located between an apparatus end groove 23 and the connector body 19 outer diameter. The apparatus end gasket 21 may be formed using a material with a high temperature rating such as silicon or epdm.

The size of the cable end opening 25 is dependant upon an expected cable 27 outer diameter. Unlike the connector body 19 outer diameter, the cable 27 outer diameter may vary within a range depending upon the different cable 27 configurations that are available. For example, an outer sheath of the cable 27 may vary in thickness and or elasticity. Also, different cable 27 outer conductor corrugation configurations may vary the cable 27 outer diameter. Therefore, a seal in the form of a cable end gasket 29 is adapted to tightly seal against a range of diameters. The cable end gasket 29 is dimensioned to be compression fitted between a conical cable end gasket surface 31 formed by the two shell halve(s) 3 and the outer diameter of the cable 27. A slit 33 in the cable end gasket 29 allows the cable end gasket 29 to be fitted over a cable 27 with a pre-attached connector 35. Because the cable end gasket 29 is compressed into a conical space, the cable end gasket 29 can adapt to a range of different cable 27 diameters and still form a reliable seal despite the presence of the slit 33. The cable end gasket 29 may be formed using a material with a high temperature rating such as silicon or epdm.

The cable end gasket 29 is compressed into a sealing position between the cable 27 outer diameter and the cable end gasket surface 31 by a nut 37 that threads onto threads 39 formed in the cable end 15 of the two halve(s) 3. To allow the nut 37 to be fitted over a cable 27 with a pre-attached connector 35, the nut 37 is formed in two parts which snap together, using an interconnection that may be similar to that used for the two shell halve(s) 3. To maximize strength of the nut 37 connection upon the threads 39, the thread 39 starting point may be located at a position on the two shell halve(s) 3, and or on the corresponding threads of the nut 37, whereby when the nut 37 is fully bottomed onto the threads 39, the split plane between the two parts of the nut 37 and the split plane between the two shell halve(s) 3 will be normal to each other.

In use, the sealing assembly 1 is prepared for interconnection by applying the edge gaskets 11 (if not pre-applied at time of manufacture) to one or both shell halve(s) 3. The apparatus end gasket 21 is installed over the connector body 19 outer diameter (before the cable 27 is connected to the connector body 19) and the cable end gasket 29 is fitted over the cable 27 via the slit 33. The two shell halve(s) 3 are snapped together around the attached cable 27 and connector body 19 with the apparatus end gasket 21 positioned in the apparatus end groove 23. The cable end gasket 29 may then be slid along the cable 27 into contact with the cable end gasket surface 31. Next, the two nut 37 parts are snapped together, around the cable 27. Finally the nut 37 is threaded onto the threads 39, compressing the cable end gasket 29 into a sealing configuration between the cable end gasket surface 31, the cable 27 outer diameter and the nut 37. Each of the sealing assembly 1 installation operations described herein may be quickly performed by hand, without the aid of any additional or specialized tools at the time the cable 27 is interconnected with the apparatus. Further, the resulting assembly uses no gel but achieves a reliable seal upon a range of cable 27 diameters and may be inexpensively adapted for use in high temperature environments via selection of widely available gasket materials having appropriate temperature ratings.

If access to the interconnection is required, the sealing assembly may be removed by reversing the steps and unsnapping the two halves. Once opened or fully removed, the sealing assembly 1 may be reused.

One skilled in the art will appreciate that the embodiment described herein may also be adapted for other apparatus and cable interconnection configurations. For example, the connector body 19 may exit a side of the apparatus for connection with a cable 27 or jumper having a right angle connector 35. For this and other situations, the sealing assembly 1 according to the invention may be modified so that the two shell halve(s) 3 are adapted to surround the desired cable and apparatus interconnection.

From the foregoing, it will be apparent that the present invention brings to the art a sealing assembly 1 for cable to apparatus connections having improved performance and significant manufacturing and installation cost efficiencies.

| Table of Parts | |
|---|---|
| 1 | sealing assembly |
| 3 | shell halve |
| 5 | hook tab |
| 7 | hook edge |
| 9 | edge |
| 11 | edge gasket |
| 13 | apparatus end |
| 15 | cable end |
| 17 | apparatus end opening |
| 19 | connector body |
| 21 | apparatus end gasket |
| 23 | apparatus end groove |
| 25 | cable end opening |
| 27 | cable |
| 29 | cable end gasket |
| 31 | cable end gasket surface |
| 33 | slit |
| 35 | connector |
| 37 | nut |
| 39 | threads |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

What is claimed is:

1. A sealing assembly for a cable to apparatus interconnection, comprising:

a pair of shell halves adapted to join together, surrounding the interconnection;

the joined shell halves having openings at an apparatus end and a cable end;

the cable end opening having a conical cable end gasket surface;

a cable end gasket adapted to fit between the cable and the conical cable end gasket surface;

the cable end gasket mountable onto the cable via a slit;

a nut formed in two parts adapted to join together, around the cable; and the nut threadable onto a thread formed at the cable end of the shell halves whereby the nut presses the cable end gasket between the cable and the conical cable end gasket surface.

2. The sealing assembly of claim 1, wherein the apparatus end opening is adapted to surround a connector body of the apparatus;

an apparatus end groove proximate the apparatus end opening adapted to retain an apparatus end gasket between the joined shell halves and the connector body.

3. The sealing assembly of claim 1, wherein the shell halves are joined together by a plurality of hook tabs that mate to corresponding hook edges formed along edges of the shell halves.

4. The sealing assembly of claim 3, wherein the edges of the shell halves are lined with an edge gasket.

5. The sealing assembly of claim 4, wherein the edge gasket is adhered to the edges of the shell halves.

6. The sealing assembly of claim 1, wherein the cable end gasket is one of epdm and silicon material.

7. The sealing assembly of claim 2, wherein the apparatus end gasket is one of epdm and silicon material.

8. The sealing assembly of claim 1, wherein the nut parts are joined by hook tabs that mate to hook edges.

9. The sealing assembly of claim 1, wherein the thread is aligned on the shell halves whereby when the nut is bottomed against the shell halves a shell halve split plane surface and a nut split plane surface are aligned substantially normal to each other.

10. A method of attaching a sealing assembly around a cable and apparatus interconnection, comprising the steps of:
   joining a pair of shell halves around the interconnection;
   placing a cable end gasket around the cable via a slit in the cable end gasket;
   joining a pair of nut parts into a nut around the cable; and
   threading the nut onto a thread formed at a cable end of the joined shell halves whereby the nut presses the cable end gasket between the cable and a conical cable end gasket surface at the cable end.

11. The method of claim 10 wherein the pair of shell halves are joined around an apparatus end gasket located in an apparatus end groove proximate an apparatus end of the shell halves.

12. The method of claim 10 wherein the pair of shell halves are joined by aligning a plurality of hook tabs with hook edges.

13. The method of claim 10 wherein the nut parts are joined by aligning a plurality of hook tabs with hook edges.

14. A sealing assembly for an interconnection of a cable with a connector and a connector body of an apparatus, comprising:
   a pair of shell halves adapted to join along an edge of each shell halve to enclose the interconnection;
   a pair of nut parts adapted to form a nut around the cable;
   a cable end gasket adapted to fit over the cable via a slit;
   the nut threadable onto a thread formed at a cable end of the shell halves whereby the cable end gasket is pressed between the cable, the nut and a conical cable end gasket surface of the joined shell halves.

15. The sealing assembly of claim 14, further including an apparatus end gasket adapted to fit between the connector body and an apparatus end groove formed proximate an apparatus end of the joined shell halves.

16. The sealing assembly of claim 14, wherein the pair of shell halves and the pair of nut parts are joined together by hook tabs that snap onto hook edges.

17. The sealing assembly of claim 15, wherein an edge gasket is located between edges of the shell halves.

18. The sealing assembly of claim 17, wherein the cable end gasket, the apparatus end gasket and the edge gasket are one of epdm and silicon material.

\* \* \* \* \*